No. 779,363.

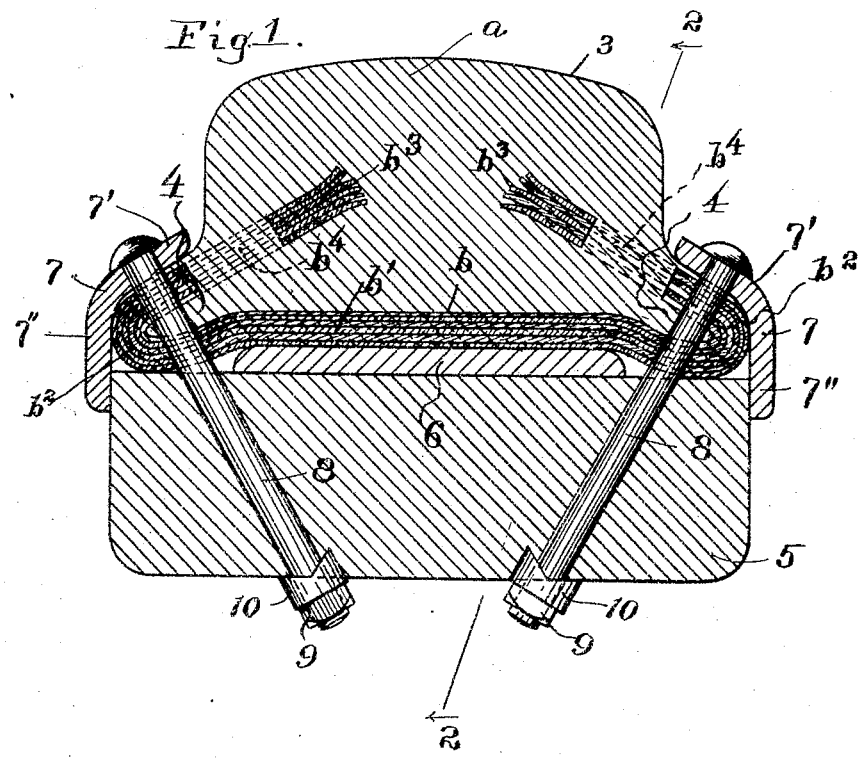
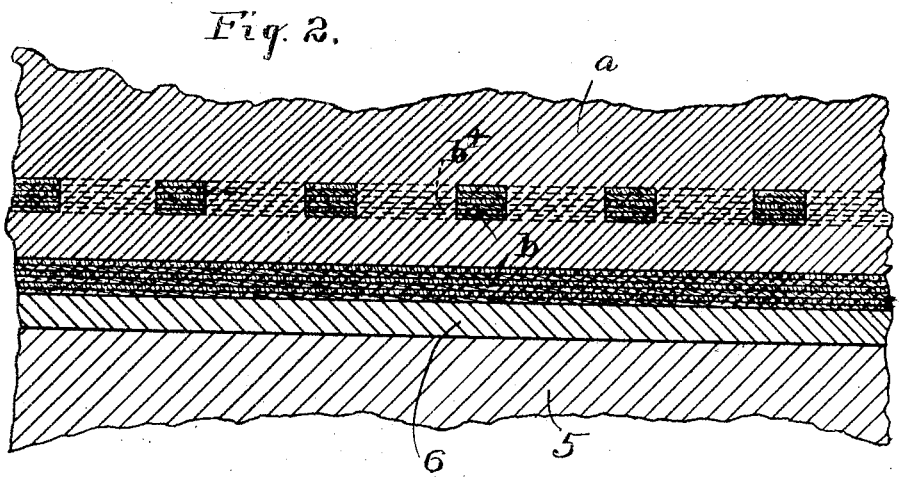

Patented January 3, 1905.

UNITED STATES PATENT OFFICE.

WILLIAM F. HOWE, OF CHICAGO, ILLINOIS.

VEHICLE-TIRE.

SPECIFICATION forming part of Letters Patent No. 779,363, dated January 3, 1905.

Application filed March 21, 1904. Serial No. 199,105.

*To all whom it may concern:*

Be it known that I, WILLIAM F. HOWE, of Chicago, in the county of Cook and State of Illinois, have invented certain new and useful Improvements in Vehicle-Tires and Means for Attaching the Same to Wheels; and I hereby declare that the following is a full, clear, and exact description thereof, reference being had to the accompanying drawings, which form part of this specification.

My invention relates to resilient vehicle-tires and means for attaching the same to wheels.

I have found that in the use of resilient vehicle-tires, particularly upon heavy automobiles, drays, and the like, a great difficulty which has to be overcome is the tendency of the tire to creep or shift upon its supporting structure whether the wheel-felly proper or a channel-rim. The best way which I have found for overcoming this tendency to self-destructive slippage of the tire is to secure the tire structure to its supporting structure by radially-disposed bolts or like means taking through the tire into the supporting structure. To permit the use of bolts, however, it is obviously necessary that the tire structure shall be strongly reinforced at the points through which the bolts take, and yet that the strengthening or reinforcing material shall be so disposed as not to impair the resiliency of the tire. It is with a view to providing such a reinforced tire adapted to be secured to its supporting structure by bolts practical and inexpensive of manufacture that my invention is primarily designed. Other and further objects, however, and the advantages incident to their accomplishment will become apparent to those skilled in the art from the following description.

In the drawings, Figure 1 is a cross-section showing a tire, its support, and attaching means embodying my invention. Fig. 2 is a longitudinal section taken on line 2 2 of Fig. 1, showing the parts in extended or flattened positions.

Throughout the drawings like characters of reference refer to like parts.

In the drawings, $a$ indicates the body of rubber forming the resilient portion of the tire. $b$ indicates a body or web of strengthening material, preferably composed of strips or laminations of fabric of suitable strength embedded in or otherwise intimately associated with the rubber in an integral tire structure.

In its general cross-sectional contour the tire preferably comprises a relatively elevated tread portion of suitable width (indicated by the numeral 3) and circumferential lateral base extensions or flanges 4 4, preferably vertically relatively thin and laterally wide enough to receive the bolts, as herein described. The essential feature of the tire structure is that the reinforcing fabric body is so disposed relative to the rubber that the lateral extensions 4 4 each include a fold of the fabric, so that two thicknesses of the strengthening material are disposed to afford strength to the said flanges or projections 4 4.

Preferably the fabric body $b$ of the tire is composed of superposed strips of sufficient width to more than extend across the tire, said strips being preferably so disposed as to extend across the tire from edge to edge of the flanges 4 at one elevation and bent back toward the middle of the tire at another elevation to form a fold $b^2$ in each of the flanges 4 4, substantially following the contour of said flange. I prefer for ease of manufacture that the fabric be disposed, as herein indicated, so that its middle portion $b'$ extends uninterruptedly across the tire in its lowest plane to form a base therefor, its ends being then reentrantly bent at an acute angle toward the middle of the tire, so that they extend upward into the tread portion 3 thereof. I deem it advisable to so proportion the fabric strips that their ends $b^3$ $b^3$ do not meet or overlap, but are separated to leave a space through which the rubber forming the tread may key with the portion immediately superposed upon the base portion $b'$ of the fabric. To further insure the cohesion of the rubber portions of the tire I prefer that the inturned end portions of the fabric strip should be perforated, as at $b^4$, such apertures $b^4$ being of any desired longitudinal extent and preferably arranged so that they extend down laterally to points in vertical alinement with the side edges of the tread portion 3 of the tire.

It will be seen that by the construction herein described the central portion of the tire is left with unimpaired resiliency, as it is composed entirely of rubber, and, indeed, the resiliency of the entire tread portion is but little effected, as the upward-extending ends of the fabric are free to play vertically with the compression or expansion of the rubber. The lateral extensions or flanges 4 4, however, it will be noted, are composed largely of fabric and have therefore but comparatively little resiliency and great strength. By the construction described a stout wearing-surface is also presented at the base of the tire and extends entirely across the same.

5 indicates a wheel-felly, and 6 indicates a retaining and strengthening band, preferably of iron, shrunk thereon or otherwise secured thereto, as well known in the art. Preferably the band 6 is about of the width of the tread portion 3 of the tire, so that it does not underlie the extensions or flanges 4 4 thereof.

7 7 indicate metallic rings disposed on opposite sides of the tire and each having an inclined portion 7' arranged to overlie the corresponding flange 4 of the tire and a generally vertical portion 7" extending down along the side of the felly 5.

8 8 indicate metallic bolts taking through and engaging the angular portions 7' of the rings 7, the tire-flanges 4, close to the angles of the fabric folds, and the tire-supporting structure or felly 5, said bolts being secured in place by nuts 9. Preferably these bolts 8 are arranged substantially radially of the wheel, but are inclined toward the lateral center of the felly, so that their heads lie flat upon the inclined portion 7' of the rings 7, while the nuts 9 are arranged to bear upon suitable washers 10, sunk in the felly structure. Such specific construction while advantageous is not, however, of the essence of the invention. I also deem it advantageous to make my tire of the endless type; but it may obviously be made in one or more flat sections and bent to the wheel.

It will be apparent to those skilled in the art that my improved tire is exceedingly simple and easy of manufacture and that its construction is such as to afford a central tread portion of practically maximum resiliency and greatly strengthened and stiffened flanges extending laterally from the base thereof to afford a practically indestructible structure through which the bolts 8 may take. Further, it will be noted that my tire is easy of application, as all of the drilling may be done after the tire is applied and clamped to the wheel by any suitable means, the bolts not having to pass through the strengthening-band 6.

For purposes of full disclosure I have herein described in detail an embodiment of my invention which I consider to be advantageous; but I desire to be understood that I do not intend thereby to limit my invention to the specific form disclosed, as it will be apparent to those skilled in the art that the principles of my invention are susceptible of wide application and that many variations in specific construction might be made without departing from its teachings.

Having described my invention, what I claim, and desire to secure by Letters Patent of the United States, is—

1. A resilient tire for vehicle-wheels comprising a resilient portion having intimately associated therewith in an integral structure a body of strengthening material having a fold therein, in combination with a supporting structure, and means for securing the tire to the supporting structure passing through both layers of the folded, strengthening material in the strengthened portion of the tire close to the angle of the fold of said strengthening material and engaging the supporting structure.

2. A resilient tire for vehicle-wheels having an elevated tread and laterally-projecting base-flanges, composed of rubber and strengthening material, the strengthening material being disposed to afford a fold to each of the base-flanges, in combination with a support, and bolts taking through both layers of strengthening material in the base-flanges and engaging the support to secure the tire thereto.

3. In combination with a wheel structure a tire having a resilient portion, and a strengthened portion comprising a plurality of superposed fabric strips embedded in the rubber in folded arrangement, with the angle of the fold disposed near the lower exterior portion of the tire structure, and means for securing the tire structure to the wheel structure comprising bolts taking through both layers of the folded fabric in the strengthened portion of the tire close to the angle of the fold in the fabric, and secured to the wheel structure.

4. In combination with a wheel structure, a resilient vehicle-tire having an elevated tread and laterally-projecting base-flanges, said flanges each embodying a body of strengthening material folded to present an angle toward the exterior surfaces of the flange, and securing devices taking radially through the flanges so as to pass through both layers of the folded, strengthening material and engaging the wheel structure.

5. A resilient tire for vehicle-wheels having an elastic tread portion and laterally-projecting base-flanges composed of rubber and strengthening material, the strengthening material being disposed to afford a fold in each of the base-flanges having its upper layer inclined at an acute angle to the base, in combination with a support, and bolts taking diagonally inward through both layers of strengthening material in the base-flanges and engaging the support to secure the tire thereto.

6. A resilient tire for vehicle-wheels, comprising an elastic portion having intimately associated therewith in an integral structure a body of strengthening material having a fold therein, the upper layer of said material being disposed at an acute angle to the base, in combination with a supporting structure, and means for securing the tire to the supporting structure, passing diagonally through both layers of the folded strengthening material at substantially right angles to the upper angularly-disposed layer of said material and engaging the supporting structure.

7. In combination with a wheel structure, a resilient tire having an elevated tread and laterally-projecting base-flanges, said flanges each embodying a body of strengthening material disposed to afford a fold in said flange, a metallic band overlying each flange, and means for securing the bands to the wheel structure, passing through the folded portions of the strengthening material.

8. As an article of manufacture a tire for vehicle-wheels comprising a rubber portion $a$ and a fabric portion $b$, the fabric portion being disposed to extend transversely of the tire-base from edge to edge, and its edges being folded inward toward the center of the tire, and said fabric portion being provided with suitable apertures $b^4$ through which the rubber portion is keyed.

9. In combination a wheel-felly, a retaining-band 6 of less width than the felly, a tire structure having a tread portion of substantially the same width as the retaining-band, and lateral base extensions of substantially the same width as the felly, and bolts taking through said base extensions and the felly on opposite sides of the retaining-band.

In testimony that I claim the foregoing as my own I affix my signature in presence of two witnesses

WILLIAM F. HOWE.

In presence of—
 FORÉE BAIN,
 MARY F. ALLEN.